United States Patent [19]

Mündel et al.

[11] 4,018,251

[45] Apr. 19, 1977

[54] MACHINE FOR MAKING REINFORCING BASKETS FOR STEEL CONCRETE POSTS, MASTS, PIPES AND THE LIKE

[75] Inventors: Günter Mündel, Kehl; Friedrich Grampp, Rheinbischofsheim-Diersheim, both of Germany

[73] Assignee: Ed. Zublin Aktiengesellschaft, Stuttgart, Germany

[22] Filed: July 9, 1975

[21] Appl. No.: 594,572

[30] Foreign Application Priority Data

July 9, 1974 Germany .......................... 2432855

[52] U.S. Cl. .................................... 140/112; 219/56
[51] Int. Cl.² ......................................... B21F 27/10
[58] Field of Search ........... 140/112; 228/199, 200; 29/163.5 CW; 219/56

[56] References Cited

UNITED STATES PATENTS

| | | | |
|---|---|---|---|
| 2,327,686 | 8/1943 | Williams et al. | 29/163.5 |
| 3,215,169 | 11/1965 | Silliman et al. | 140/112 |
| 3,250,888 | 5/1966 | Olivier et al. | 140/112 |
| 3,437,114 | 4/1969 | Whitacre et al. | 140/112 |

Primary Examiner—Lowell A. Larson
Attorney, Agent, or Firm—Walter Becker

[57] ABSTRACT

A machine for making reinforcing baskets for steel concrete posts, masts, pipes and the like, which includes a device for displacing longitudinal basket wires, a winding device for helically winding other wire about the longitudinal basket wires, and a welding device for connecting the other wire to the longitudinal basket wires. The device for dispensing longitudinal basket wires comprises individual guides for the longitudinal basket wires, and the winding device and the welding device are arranged inside a ring for the individual guides.

16 Claims, 2 Drawing Figures

MACHINE FOR MAKING REINFORCING BASKETS FOR STEEL CONCRETE POSTS, MASTS, PIPES AND THE LIKE

The present invention relates to a machine for making reinforcing baskets for steel concrete posts, masts, pipes and the like which is provided with a device for displacing longitudinal basket wires and which includes individual guiding means for longitudinal wires which guiding means are arranged about a, particularly vertical, winding axis. More specifically, the invention concerns a mast of the above mentioned type which includes a winding device for a winding basket wire that is to be applied helically around the longitudinal wires, said winding device being rotatable about a winding axis, while furthermore there is provided a welding device for securing the helical wire to the longitudinal wires.

With heretofore known masts of the above mentioned type for making reinforcing baskets of the type involved, the winding device rotates radially outside the individual guiding means for the longitudinal wires. This results, especially when making reinforcing baskets of great diameter, in a considerable space requirement. Furthermore, this design makes the mounting of the winding device rather difficult.

Furthermore, machines of the above mentioned general type have become known in which the winding device is arranged outside at a fixed point and during the winding, the entire reinforcing basket turns. This requires additional means and expenses for the drive because the reinforcing basket has a considerable weight.

It is, therefore, an object of the present invention to design a machine for making reinforcing baskets for the above mentioned purpose, which will be simple in construction, will require a minimum of space and permits a simple mounting of the winding device.

These and other objects and advantages of the invention will appear more clearly from the following specification in connection with the accompanying drawings, in which.

The machine according to the invention for making reinforcing baskets for steel concrete posts, masts, pipes and the like is provided with a device for displacing longitudinal basket wires which includes individual guiding means for the longitudinal wires, while the individual guiding means are arranged in a ring. The machine according to the invention furthermore is equipped with a winding device that is rotatable about the winding axis, for a helical winding wire to be applied to the longitutinal wires, while a welding device is provided for securing the helical wires to the longitudinal wires. In conformity with the present invention, the winding device and the welding device are arranged within the ring for the individual guiding means.

Figure 1:
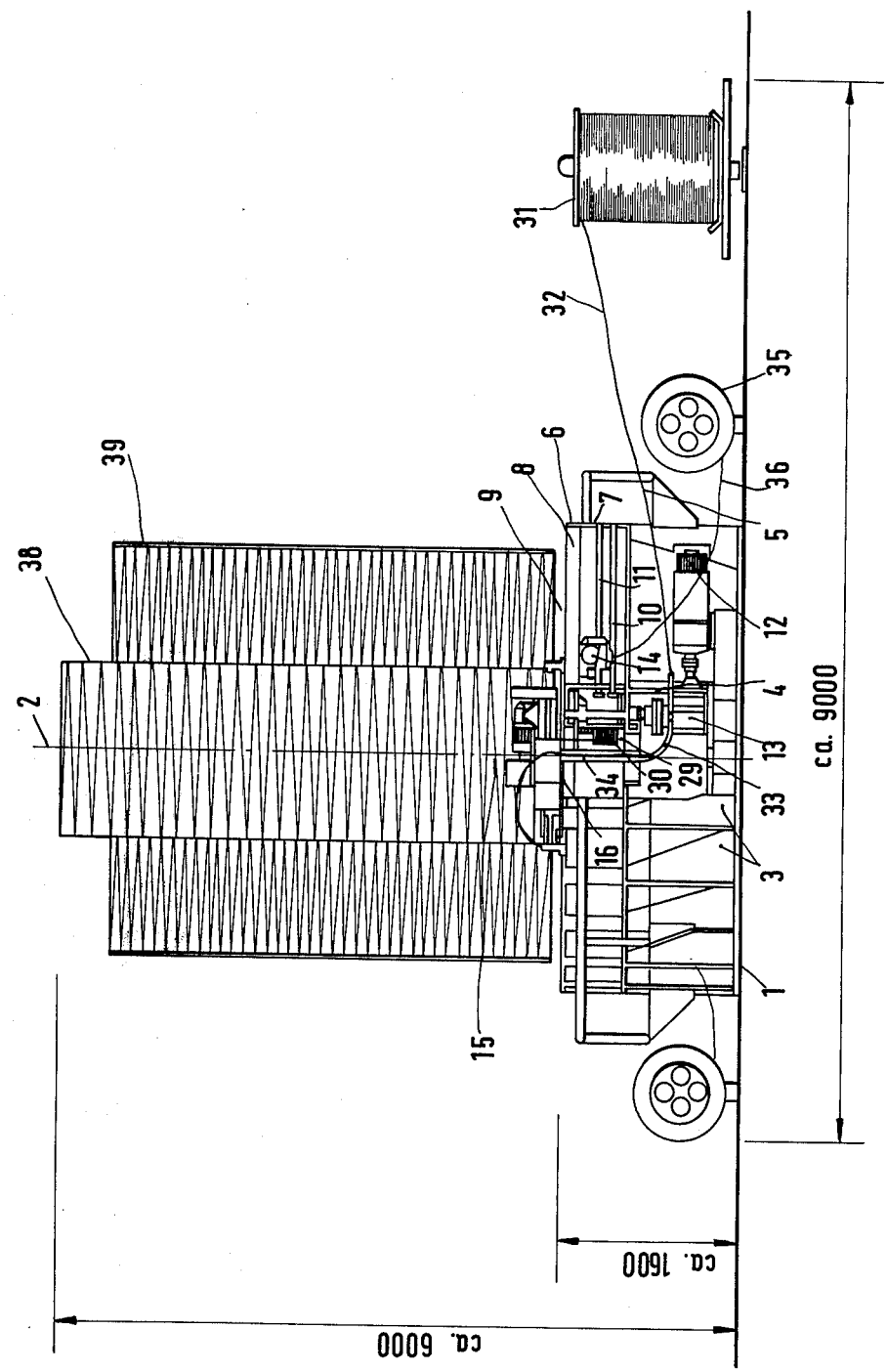
FIG. 1 illustrates a machine according to the invention partly in view and partly in section.
Figure 2:
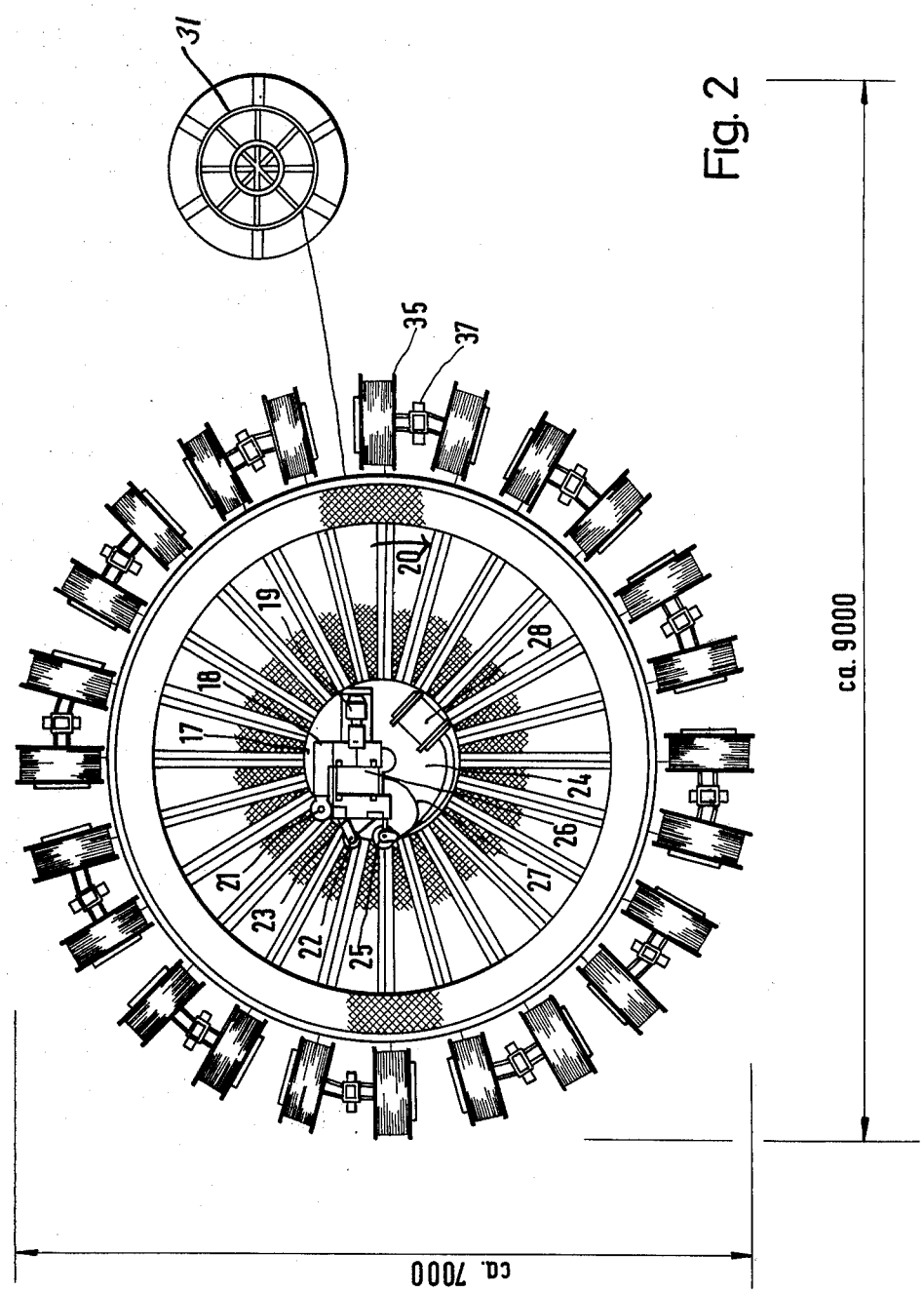
FIG. 2 is a top view of the machine shown in FIG. 1.

Referring now to the drawings in detail, FIGS. 1 and 2 illustrate a machine according to the invention which comprises a machine stand 1, to be placed upon a foundation. The machine stand 1 consists primarily of supporting plates 3 which are arranged in radial planes around the vertical machine axis 2. In the center the machine is equipped with a housing 4 which is likewise mounted on a foundation and which is coaxial with a machine axis 2 and may for instance be cylindrical. At the top side of the machine stand 1 which is surrounded by a gangway or foot path 5 there is provided a device 6 for displacing longitudinal basket wires. This device 6 comprises vertical strip-shaped bearing plates 7 which are distributed over the circumference of the device 6 and on which are arranged radial guides 8 for feeding devices 9, said guides 8 being uniformly distributed around the machine axis 2. Due to the design of the machine according to the invention, a relatively great number of feeding devices 9 may be provided while with the illustrated embodiment 24 feeding devices 9 are distributed about the machine axis 2 and are independently of each other displaceably arranged on a horizontal guiding path 8 so as to be displaceable radially with regard to the machine axis 2. Each feeding device 9 which is suspended on the guide 8 formed for instance by a cylindrical guiding rod, engages a threaded spindle 10 which is located below the guide 8 and parallel thereto. The feeding device 9 is expediently with the guide 8 located in a common axial plane of the machine axis 2 while all threaded spindles 10 have their radial inner ends equipped with gears 10a which mesh with a common gear ring coaxial with the machine axis 2. This gear ring is drivingly connected to an adjusting motor (not shown in detail) in the stand 1 so that all feeding devices 9 can be radially adjusted together.

Between the guide 8 and the threaded spindle 10, each feeding device 9 engages a driving rod 11 which is likewise parallelly to the guide 8 or together therewith located in a common axial plane of the machine axis 2, and similarly to the threaded spindles 10 and guides 8 have their outer ends journalled in the bearing plate 7 while their inner ends are journalled in corresponding inner bearing plates. The driving rods 11 have their radially inner ends likewise equipped with gears 11a, while the gears of all driving rods 11 mesh with a further gear ring which is coaxial with the machine axis 2 and which is driven by a motor 12 on stand 1 through the intervention of a variable speed transmission 13. The two gear rings which are located opposite to each other have their end teeth at those end faces which face each other. By the said last mentioned end faces, the gears are arranged in rings located directly above each other while the gears are located on those sides of the inner bearing plates which face the machine axis 2. These bearing plates are spaced from the machine axis 2 by a distance which is only slightly greater than half of the diameter of the inner housing 4. Each feeding device 9 is in the housing guided on the pertaining guide 8 provided with a transmission meshing with the pertaining driving rod 11. This transmission is at the output side drivingly connected to feeding rollers 14 between which the respective pertaining longitudinal wire is passed. The feeding rollers 14 are provided laterally below the guide 8 on the housing of the pertaining feeding device 9 while the axes of said rollers 14 are horizontal.

The axes of the feeding rollers 14 are tangential with regard to the machine axis 2.

Rotatably journalled on the top side of the device 6 is a winding device 15 which is rotatable about the machine axis 2. The winding device 15 includes an annular support 16 which has a considerably shorter diameter than the device 6. The diameter of the support 16 is only slightly greater than twice the radial distance of the inner bearing plates of device 6 from the machine axis 2. A winding head 18 which is displaceable radially with regard to the machine axis 2 is located on an annular base plate 17 which is coaxial with the machine axis 2 and is connected to the support 16. The winding head 18 in addition to being displaceable radially with regard to the machine axis 2 is adapted to be rested in its respective position. The winding head 18 can be adjusted by means of a horizontal adjusting motor 19 which is connected to the support 16 or the base plate 17. On the winding head 18, in the working direction (indicated by arrow 20) of the winding device 15 there are serially arranged two guiding rollers 21, 22. The angular distance between these guiding rollers 21, 22 with regard to the machine axis 2 amounts to approximately 30°, and the front (when looking in the direction of arrow 20) guiding roller 21 is spaced from the machine axis 2 by a slightly shorter radial distance than the second guiding roller 22. The guiding rollers 21, 22 are rotatably journalled for rotation about axes which are approximately parallel to the machine axis 2. The rear (when viewing in the working direction indicated by arrow 20) guiding roller 22 is movable in a direction transverse to the machine axis 2 and is spring urged for moving outwardly. With the illustrated embodiment, this guiding roller 22 is journalled at the end of a pivotable arm 23 which is pivotally connected to the winding head 18 at a point offset relative to the axis of the guiding roller 22 and is pivotable about an axis parrallel to the machine axis 2.

In a direction opposite to the working direction indicated by the arrow 20 and adjacent to the rear guiding roller 22, there is provided a welding roller 25 of a welding device 24 which is likewise provided on the support 16. The welding roller 25 which is parallel to the machine axis 2 and which is spaced from the machine axis 2 by approximately the same radial distance as the guiding roller 22 is journalled on the winding head 18 and therefore is adjustable together with the latter. The distance of the welding roller 25 from the guiding roller 22 is less than the distance between the two guiding rollers 21, 22. A transformer 26 of the welding device 24 is connected to the winding head 26 and through a welding cable 27 is connected to the welding head which carries the welding roller 25. A cooler 28 for the welding device is for purposes of obtaining favorable load conditions connected to the support 16 or the base plate 17 and through conductors is connected to the welding head. The cooler 28 is located approximately diametrically opposite the welding head 18. The welding device 24 is through a current pick-up 29 connected to a source of current. The current pick-up 29 is located below the winding device 15 and has sliding contacts located approximately at the level of the device 6 in a central housing mantle 30 which is located within the inner bearing plates of device 6 or gear rings. The winding head 18 can from the radial innermost position shown in FIGS. 1 and 2 be adjusted outwardly to such an extent that the guiding roller 22 or the welding roller 25 are located nearly within the region of the outer ends of the guides 8.

Radially spaced from and outside the machine stand 1 and parallel to the machine axis 2 there is rotatably mounted a reel 31 for the helical wire 32. The height of the reel 31 equals approximately the height of the machine stand, up to the topside of the device 6. The reel 31 may be mounted on the same foundation as the stand 1. The wire 32 is from the reel 31 passed between two plates 3 below the device 6 over a deviating guide 33 from below into a tubular wire passage or conduit 34 which is arranged on the rotor of the winding device 15 or on the base plate 17. The wire passage 34 coaxial with the machine axis 2 extends from the winding device 15 downwardly and may be rotatably arranged opposite the support 16 while expediently freely hanging downwardly. From the upper end of the wire passage 34, the helical wire 32 is passed to the first guiding roller 21 and from the latter to the second guiding roller 22.

Reels 35 for longitudinal wires 36 are rotatably journalled in a ring about the machine stand 1 or the machine axis 2. These reels 35 which correspond in number to the number of the feeding devices 9 are uniformly distributed about machine axis 2 while their axes are located tangentially with regard to the machine axis 2. Each two adjacent reels 35 are mounted on a common stand 37 therebetween. The stand 37 is adjacent to the stand 1 arranged on the same foundation as the latter. Due to this design, a much space saving arrangement of the reels 35 is obtained which forms the storage means or supply means for the longitudinal wires 36. Each longitudinal wire 6 is passed from the bottom side of the respective reel 35 between two adjacent stand plates 3 in upward direction to the pertaining feeding device 9 which pushes the longitudinal wire 36 upwardly.

In each position of the feeding devices 9, the latter are arranged in a ring about the machine axis 2. The winding device 15 which applies the helical wire 32 radially outwardly to the longitudinal wires 36, is so designed that with the respective position of operation of the machine the winding device 15 is located radially completely inside the ring of the feeding devices 9 or the longitudinal wires 36 which pass from the feeding devices 9 parallel to the machine axis 2.

FIG. 2 shows two reinforcing baskets 38,39 of different diameters which can be continuously produced by the machine according to the invention. During the manufacture of the reinforcing basket, the winding device 15 is rotated by a driving motor not specifically shown. Simultaneously, the feeding devices 19 are driven by the motor 12 so that the helical wire 32 is along a helical path placed onto the inner sides of the upwardly moving longitudinal wires 36 and directly subsequently thereto is by means of the welding roller 25 connected to each crossing point with a longitudinal wire. During the advancing of the longitudinal wires 36, guiding means above the feeding rollers 14 form the individual guides 40 for the longitudinal wires 36 so that the latter will be precisely aligned.

As will be evident from the above, the design of the machine according to the present invention considerably simplifies the manufacture of reinforcing baskets because the welding device located within the basked to be produced can be rotatably guided in a simple manner so that the provision of a plurality of welding electrodes distributed over the circumference of the basket will not be necessary. The design according to the present invention is suitable particularly for machines with upright winding axis because in such an instance, the plan surface required for setting up the machine can be kept very small independently of the length of the reinforcing baskets to be made. Furthermore, a design according to the invention permits a very uniform feeding of the longitudinal wires.

It is, of course, to be understood that the present invention is, by no means, limited to the specific showing in the drawings, but also comprises any modifications within the scope of the appended claims.

We claim:

1. A machine for making reinforcing baskets with longitudinal basket wires and helical wires around said basket wires for steel concrete posts, masts, pipes, and the like, which includes in combination: a displacing device operable to displace longitudinal basket wires and comprising wire storage means and individual guiding means therewith for movement of said longitudinal basket wires, a ring member, said guiding means being arranged in said ring member about a vertical winding axis, a wire winding device mounted on a rotor rotatable about said vertical winding axis and having wire feeding means for helically applying winding wire in contact with said longitudinal basket wires successively for welding thereto, and a wire welding device mounted on said rotor closely following said wire feeding means on rotation with said feeding means for securing said winding wire, while in contact with each longitudinal wire, both said wire winding device and said wire welding device being located inside said ring member for said individual guiding means.

2. A machine in combination according to claim 1, which includes a rotor carrying said winding device, reel means for receiving a supply of winding wire, and wire conveying means interposed between said reel means and said winding device for conveying winding wire from said reel means to said winding device, said wire conveying means including a wire passage through said rotor.

3. A machine in combination according to claim 2, in which said reel means is rotatably journalled outside said ring member, and in which said wire passage has its axis coincide with the axis of said rotor.

4. A machine in combination according to claim 2, in which said wire conveying means passes from below upwardly to said winding device, and in which said wire passage is a conduit suspended on said rotor carrying said winding device.

5. A machine in combination according to claim 2, in which said welding device is mounted directly on said rotor and includes a welding electrode, and in which said winding device includes an annular support, said machine also comprising a base plate coaxially arranged with the axis of said machine, a winding head displaceable radially with regard to said machine axis and arrestable relative thereto, and a guiding element for applying the winding wire to the longitudinal basket wires and mounted on said head, said winding head being about radially adjustable and being mounted on said rotor, and said welding electrode being mounted on said head.

6. A machine in combination according to claim 5, which includes an adjusting motor arranged on said rotor of said winding device for displacing said head.

7. A machine in combination according to claim 6, in which said adjusting motor is parallel to the displacing direction of said head.

8. A machine in combination according to claim 2, in which said rotor for said winding device comprises current pick-up means for said welding device.

9. A machine in combination according to claim 8, which includes a housing mantle, and in which said current pick-up means are located below said rotor in said housing mantle.

10. A machine in combination according to claim 1, which includes a machine stand supporting said displacing device, and in which said winding device is arranged on the top side of said machine stand.

11. A machine in combination according to claim 10, in which said winding device is arranged on the top side of said displacing device.

12. A machine in combination according to claim 2, in which said rotor carrying said winding device comprises a base plate coaxial with the winding axis of said winding device and having the latter mounted thereon.

13. A machine in combination according to claim 12, in which said winding device is provided with a winding head, and which includes a cooler for said welding device, said cooler being located on said base plate diametrically opposite said head.

14. A machine incombination according to claim 2, which includes a plurality of reels for said longitudinal basket wires, said reels being arranged outside said ring member for said individual guiding means and being located along a circle coaxial with the winding axis of said vertical winding device.

15. A machine in combination according to claim 14, in which the axes of said reels are tangential with regard to said vertical winding axis.

16. A machine in combination according to claim 14, which includes means for passing said longitudinal basket wires from the bottom side of said reels upwardly to said individual guiding means.

* * * * *